United States Patent [19]

Van Sickle

[11] 4,217,698
[45] Aug. 19, 1980

[54] METHOD OF AND APPARATUS FOR MEASURING THE AXIAL DISPLACEMENT (LATERAL) OF A TAPERED ROLLER BEARING ASSEMBLY FOR USE IN RAILROAD ROLLING STOCK

[75] Inventor: Robert J. Van Sickle, Richmond, Va.

[73] Assignee: Rail Bearing Service, Richmond, Va.

[21] Appl. No.: 20,746

[22] Filed: Mar. 15, 1979

[51] Int. Cl.² .............................................. G01B 5/00
[52] U.S. Cl. ............................... 33/174 R; 33/143 L; 33/169 R
[58] Field of Search ............ 33/172 E, 169 R, 174 R, 33/174 Q, 174 L, 180 R, 185 R, 180 AT, 181 AT, 143 L

[56] References Cited

U.S. PATENT DOCUMENTS

| | | | |
|---|---|---|---|
| 2,468,875 | 5/1949 | Henrikson | 33/174 R |
| 2,916,830 | 12/1959 | Esken | 33/174 L |
| 2,932,900 | 4/1960 | Hanlon | 33/174 R |
| 3,191,259 | 6/1965 | Dalton | 33/174 R |

Primary Examiner—Willis Little
Attorney, Agent, or Firm—Richard P. Matthews

[57] ABSTRACT

A method of and apparatus for measuring the axial displacement of a tapered roller bearing assembly which eliminates the unnecessary handling of cone assemblies. After a bearing assembly to be measured is centered on the natural vertical axis of the machine, a mandrel is inserted into the bearing to lift it above a work surface of the machine. The mandrel is provided with a flange which engages and force loads the lower cone assembly. When the mandrel has lifted the bearing assembly into abutting relationship with a downwardly spring-loaded pressure plate, a bifurcated locking means supports the cup of the bearing assembly. The force is then reduced so that the spring pressure on the pressure plate force loads the upper cone assembly. A digital readout device measures the lateral movement of the roller bearing assembly in moving between the two force loading positions. The pressure plate is preferably rotatable and the machine is programmed for a metered oil spray lubrication of the cone assemblies and cup raceways. If the digital readout is within acceptable tolerance, the cup lock is released and the bearing assembly is lowered to the work surface on the machine and ejected by the same means used to center the bearing assembly. If the digital reading is out of tolerance, the cup lock is maintained and the mandrel is withdrawn which re-deposits only the lower cone assembly and the spacer element stacked thereabove. The spacer is then exchanged and the mandrel raises the lower cone assembly and spacer into the cup for a re-measurement.

19 Claims, 8 Drawing Figures

METHOD OF AND APPARATUS FOR MEASURING THE AXIAL DISPLACEMENT (LATERAL) OF A TAPERED ROLLER BEARING ASSEMBLY FOR USE IN RAILROAD ROLLING STOCK

This invention relates to a method of and apparatus for measuring the axial displacement of a tapered roller bearing assembly and, more particularly, to such a method and apparatus which eliminates a substantial amount of the cone handling operations.

Heretofore, it has been known to measure the axial displacement (lateral) of tapered roller bearings and to substitute spacers to compensate for wear on used bearings and manufacturing tolerances on new bearings in which a considerable amount of manual handling of the bearings has been required. Because these bearings may weigh 80 pounds or more and because they are cumbersome and difficult to handle, these previously known devices have not been satisfactory.

The term "lateral" is used herein to designate the axial movement of the internal bearing assemblies in the course of being axially loaded in two opposite directions.

In accordance with the present invention, a positive locational loading is used to centralize the bearing assembly with respect to the working vertical axis of the machine. The axial displacement measurement is taken from a non-rotating natural center line on the bearing assembly, thereby eliminating component runout. Furthermore, the measuring instrument position is fixed for all bearing sizes thereby eliminating error caused by changes in size through adjustments.

While the tapered roller bearing assembly is lifted from the work surface of the machine, an automatic metered oil spray is programmed to lubricate the cone ribs and cup raceways of the tapered roller bearings. Because the function cycles are pre-programmed and automatic, the measuring device of the present invention assures that all bearings receive the same function sequence, time factor, loading forces, metered oil spray, and lubrication of parts.

Many of the features of the present invention will become more apparent upon considering the following principal method steps of the invention:

a. the tapered roller bearing is centered on a work surface with respect to a vertical axis of the machine with the tapered roller bearing assembly including a cylindrical cup having an internal raceway within which is positioned a lower cone assembly, an upper cone assembly and a cylindrical spacer between the upper and lower cone assemblies;

b. a mandrel is automatically inserted into the lower cone assembly with the mandrel having a flange which is engageable with the lower cone assembly in order to lift the entire bearing assembly from the work surface a sufficient distance to permit withdrawal of the lower cone assembly and spacer;

c. the lower cone assembly is then lifted by the mandrel thereby force loading the lower cone assembly in its raceway within the cup and thereby lifting the entire tapered roller bearing assembly;

d. the cup is then supported and locked against rotation in raised position;

e. the upper cone assembly is then force loaded while releasing the force loading on the lower cone assembly;

f. the lateral for the roller bearing assembly is the distance moved from one force loading position to the other force loading position.

Additional steps of the invention then depend upon the lateral measurements that are obtained. Thus, if the lateral dimension measured in the foregoing manner is within acceptable tolerances, the support for the mandrel, which takes the form of a locking element, is discontinued and the entire tapered roller bearing assembly is lowered by the mandrel onto the work surface after which the tapered roller bearing assembly is automatically ejected from the vertical axis of the machine.

If the measurement obtained is not within the acceptable tolerances, the mandrel is then lowered beneath the work surface while continuing to support the cup in its raised position thereby withdrawing and placing only the lower cone assembly on the work surface with the spacer stacked thereon. This makes the spacer readily accessible so that it may be measured to determine what size spacer will be required to bring the lateral measurement within acceptable tolerances. At this time, another spacer is selected and put on top of the cone. The mandrel is then raised above the work surface sufficiently far to reinsert the lower cone assembly and the replacement spacer for another measurement of the lateral axial displacement.

The inherent advantages and improvements of the present invention will become more readily apparent upon reference to the following detailed description of the invention and by reference to the drawings in which.

Figure 1:
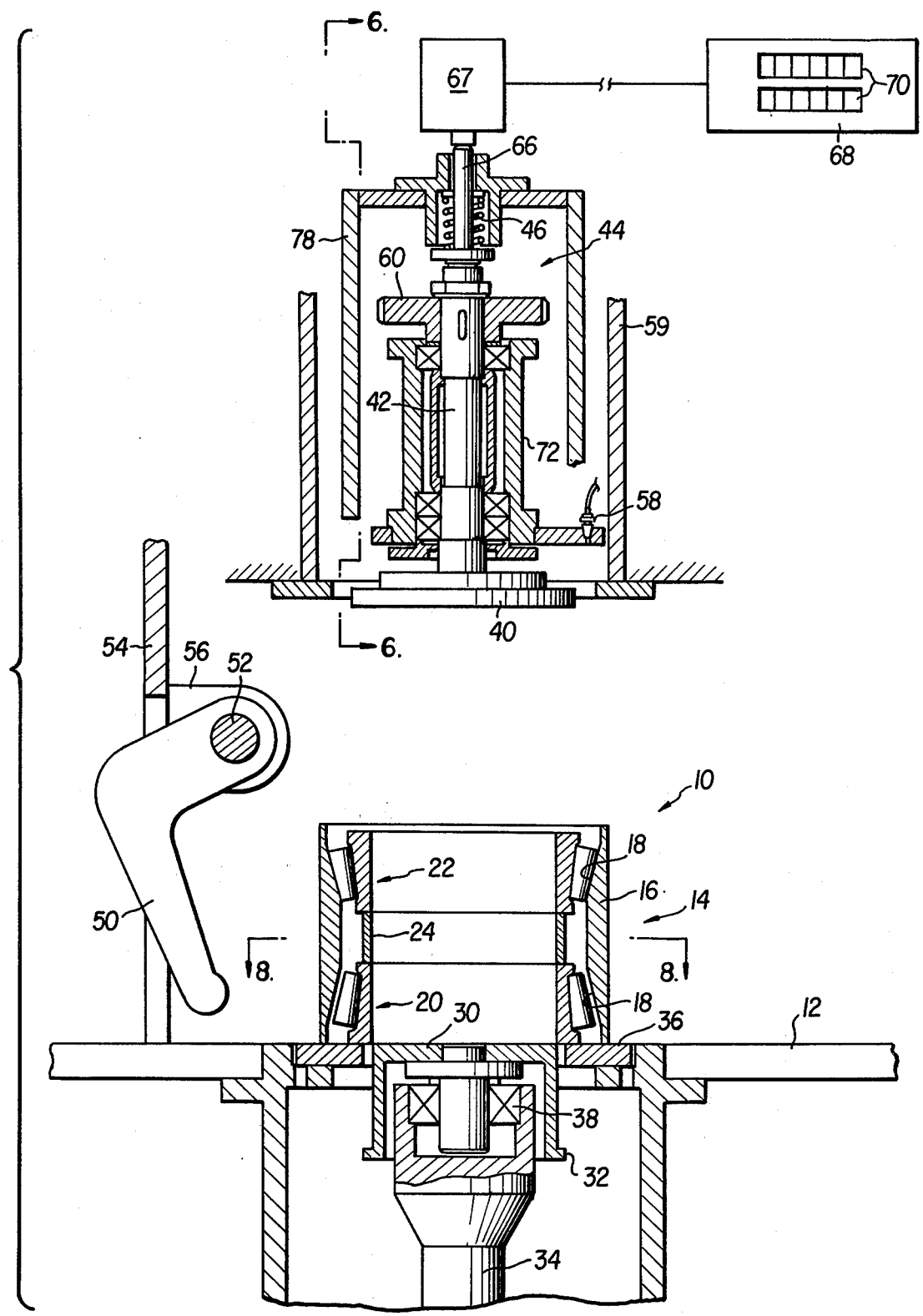
FIG. 1 is a front vertical elevational view of the tapered roller bearing measuring apparatus of the present invention, taken predominantly in vertical cross section.
Figure 2:
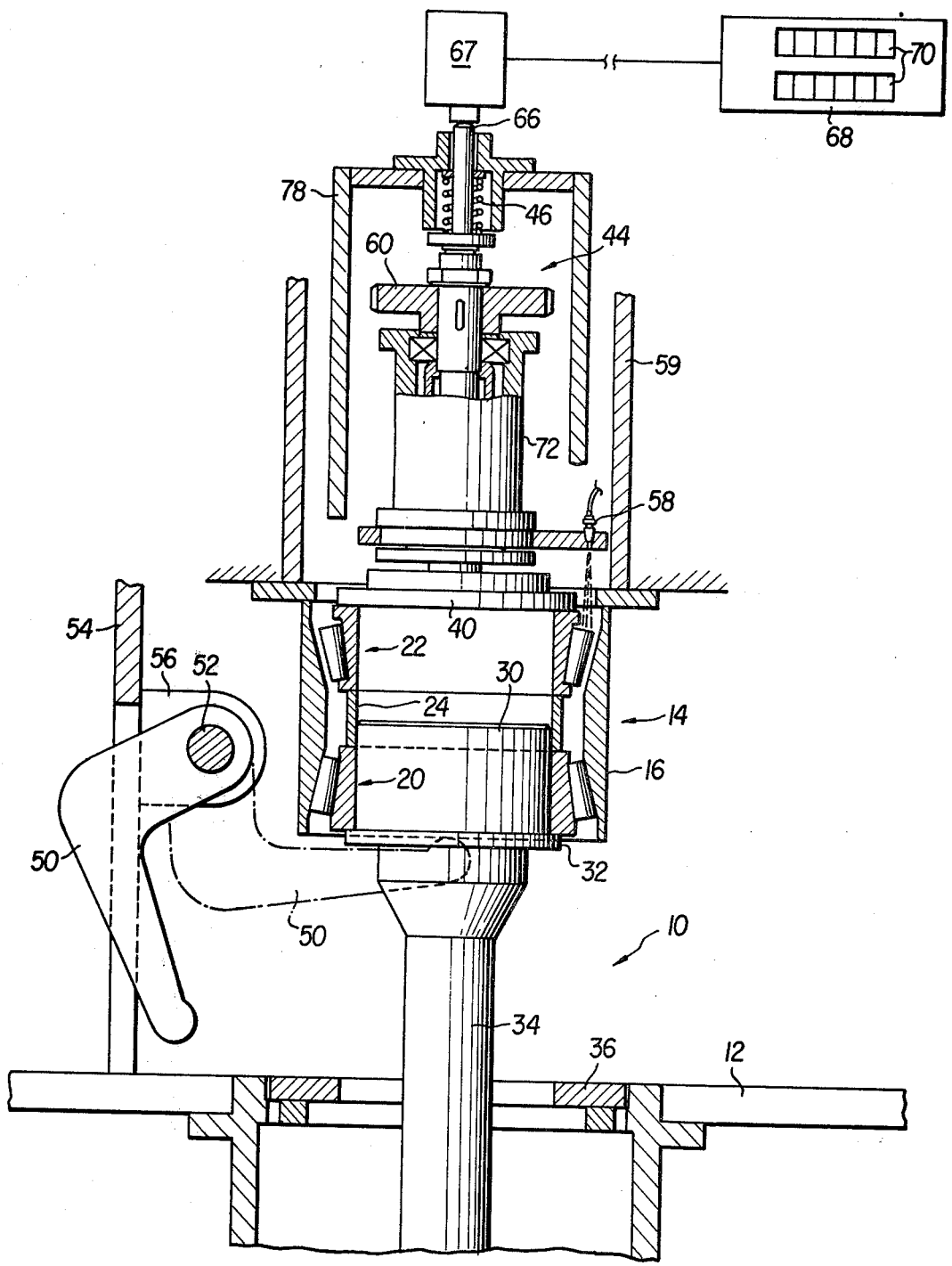
FIG. 2 is a vertical elevational view, similar to FIG. 1, but showing a different position of the apparatus.
Figure 3:
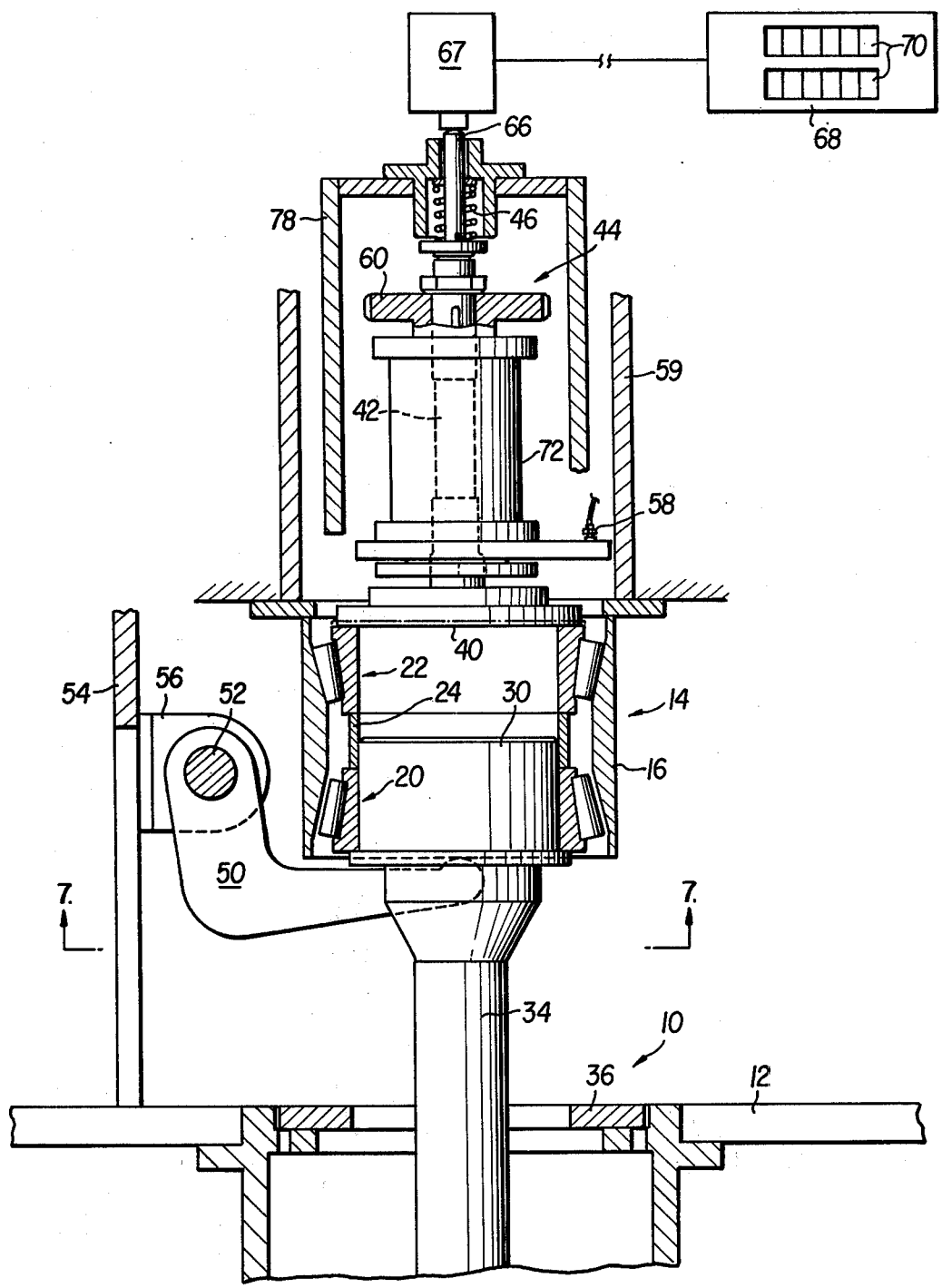
FIG. 3 is a vertical elevational view, similar to FIG. 1, but showing the position of the apparatus at the time the lateral measurement is taken.
Figure 8:
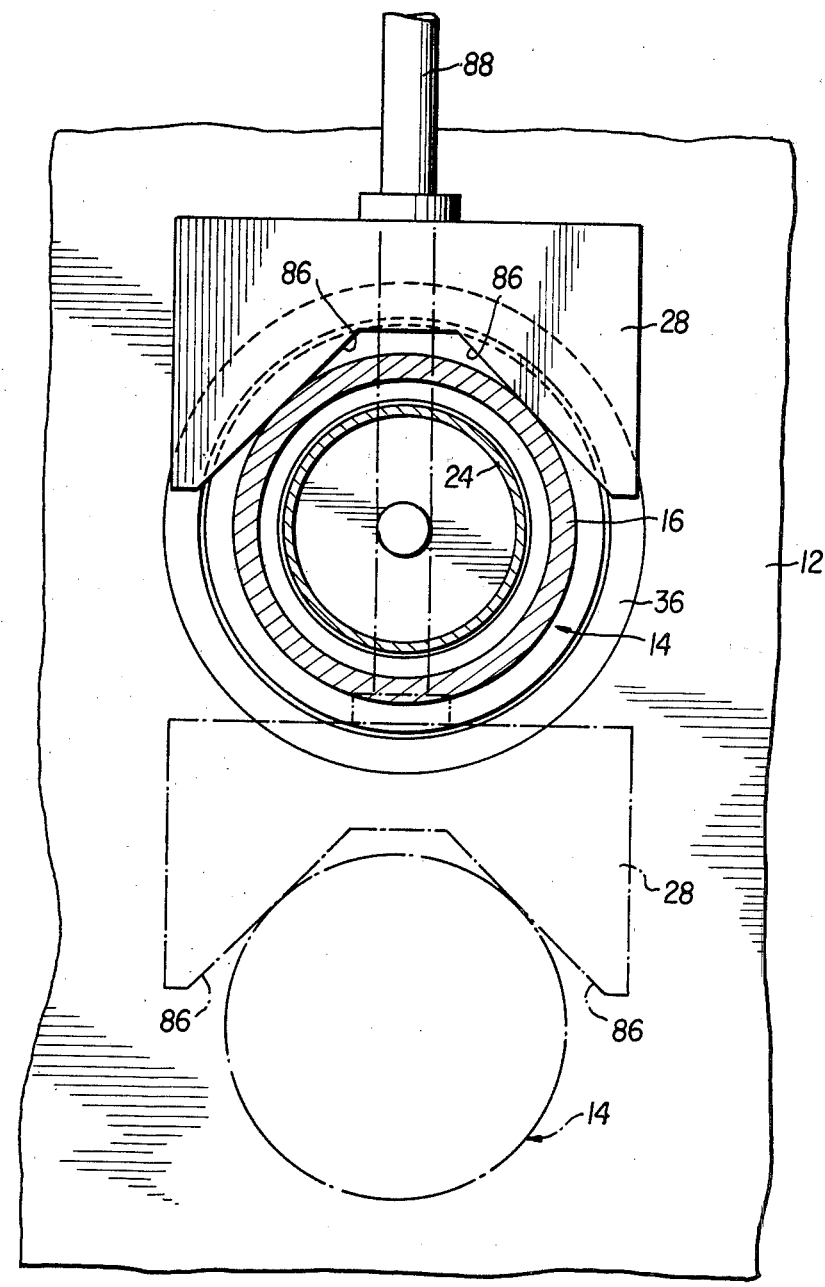
FIG. 8 is a top plan view taken in vertical cross section along line 8—8 of FIG. 1.

Referring now to FIGS. 1-3 of the drawings, there is illustrated an axial displacement measuring apparatus indicated generally at 10, provided with a horizontal work surface 12. In FIG. 1, a tapered roller bearing assembly is indicated generally at 14 and is shown on the vertical center line of the apparatus ready to be lifted vertically for purposes of measuring the lateral axial displacement for the tapered roller bearing. The tapered roller bearing assembly 14 includes a cylindrical cup 16 having two internal raceways 18, a lower cone assembly 20 and an upper cone assembly 22. Between the two cone assemblies is positioned a spacer 24 which is used to compensate for manufacturing tolerances in new bearings and manufacturing tolerances plus wear in used bearings in the individual bearing parts. The tapered roller bearing assembly 14 is initially positioned on the center line of the machine by means of a V- shaped centering block 28 as shown in FIG. 8 and which will be described more fully hereinafter.

In order to raise the tapered roller bearing assembly 14 above the work surface 12 there is positioned a mandrel 30 along the center line of the machine. The mandrel 30 is generally cup-shaped and is provided with a flange 32 which extends outwardly from the sides of the mandrel and is actuated vertically by means of ram 34.

Cooperating with the work surface 12 and providing an extension thereof is an adapter insert 36 on which the tapered roller bearing assembly rests. One of these adapter inserts is provided for each size of tapered roller bearing. The mandrel 30 is capable of being rotated about a vertical axis by the use of bearings 38.

After the tapered roller bearing assembly 14 has been centered, it is lifted with the force transmitted through ram 34 until the upper cone assembly contacts a pressure plate 40 attaining the position shown in FIG. 2. Pressure plate 40 is attached to the lower end of a rotatable shaft 42 all of which is part of an axial shifting cartridge indicated generally at 44. Substantially in line with the shaft 42 is a spring means 46 which is normally loaded downwardly.

Figure 7:
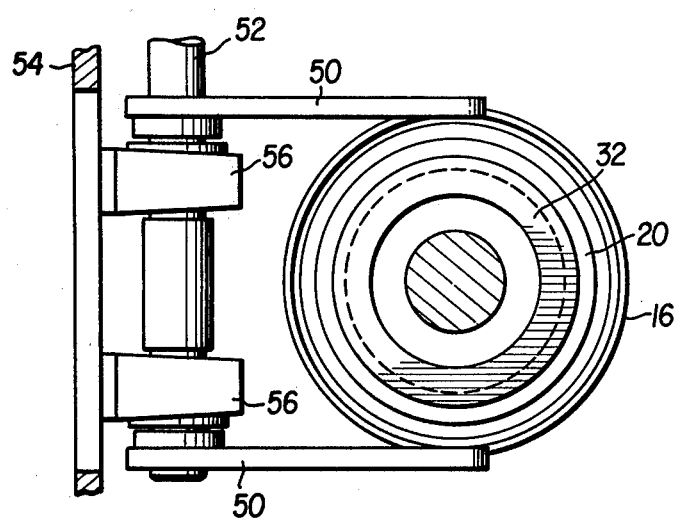
FIG. 7 is a bottom plan view taken in horizontal cross section along line 7—7 of FIG. 3.

In order to provide support for the elevated position of the tapered roller bearing assembly 14, a bifurcated locking member 50 is provided which is pivotally mounted on shaft 52 and which is more fully illustrated in FIG. 7. This bifurcated locking member 50 is supported by means of a vertical support frame 54 to which is attached a pair of bearings 56 to support the shaft 52. In moving from the position of FIG. 1 to the phantom position of FIG. 2, a suitable actuator, not shown, is energized to lock the bearing cup 16 against a frame 59 as shown in FIG. 2. The pressure plate 40 displaces spring 46 vertically upwardly. Simultaneously, a switch, not shown, is energized to bring the cup lock 50 into locking position such as by means of an additional actuator, not shown. Also at this time an oil spray 58 is energized. The oil spray is so positioned that it sprays onto the bearings and internal raceway.

Figure 6:
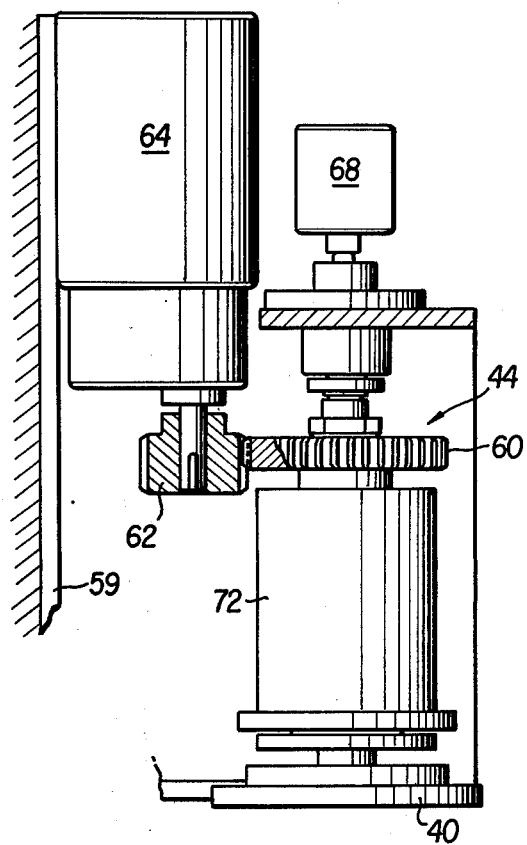
FIG. 6 is a vertical side elevational view of the axial shifting cartridge of FIG. 1.

In addition, and as more fully illustrated in FIG. 6, a gear 60 on shaft 42 is driven by pinion gear 62 at this time. Motor 64 is energized to rotate gears 62, 60 and thereby rotating pressure plate 40 which results in rotation of the upper cone assembly 22, the lower cone assembly 20 and spacer 24. This rotation continues for a given time interval, then pauses and waits for an operator to zero a digital readout device 68. The digital readout device has a plural display means 70 for the digital readout itself. An axial displacement rod 66 is shown in line with shaft 42 whereby the axial measurement (lateral) may be obtained and this measurement is transferred by a suitable transducer 67 to the digital readout device 68. A suitable bearing supported housing 72 surrounds shaft 42 which transmits the rotation of gear 60 to pressure plate 40.

Referring again to FIGS. 2 and 3, after the rotation of the pressure plate 40 ceases, and the lubrication through lubrication means 58 also ceases, and the operator has zeroed the digital readout device 68, the operator presses a button designated "axial shift" which functions to reduce the force which holds mandrel 30 upwardly. This results in a lessening of the force on the mandrel 30 so that the spring 46 which now has the superior force will downshift the cone assembly and force load the top cone into the raceway rather than the bottom cone. This displacement is the axial reading (lateral). At this time, if the lateral dimension so measured is within limits, which are predetermined by a set of standards, the operator will depress a further button entitled "lateral good" and the cup lock 50 will unlock and pivot to its FIG. 1 position while mandrel 30 will retract and be withdrawn beneath the work surface 12. One measure of the lateral being measured is the difference in positions between the FIG. 2 and FIG. 3 illustrations for the top surface of the upper cone assembly 22 as is indicated between the solid and phantom positions in FIG. 3.

Once the bearing reaches the work surface table top, the V-centering device 28 comes into play and ejects the roller bearing assembly. As shown in FIG. 8, the V-centering device 28 has a pair of generally V-shaped bearing assembly engaging surfaces 86 and an actuating rod 88 attached to another actuator means, not shown, in order to move the V-shaped centering block 28 to the phantom position shown in FIG. 8 where the operator then removes the bearing assembly.

Figure 4:
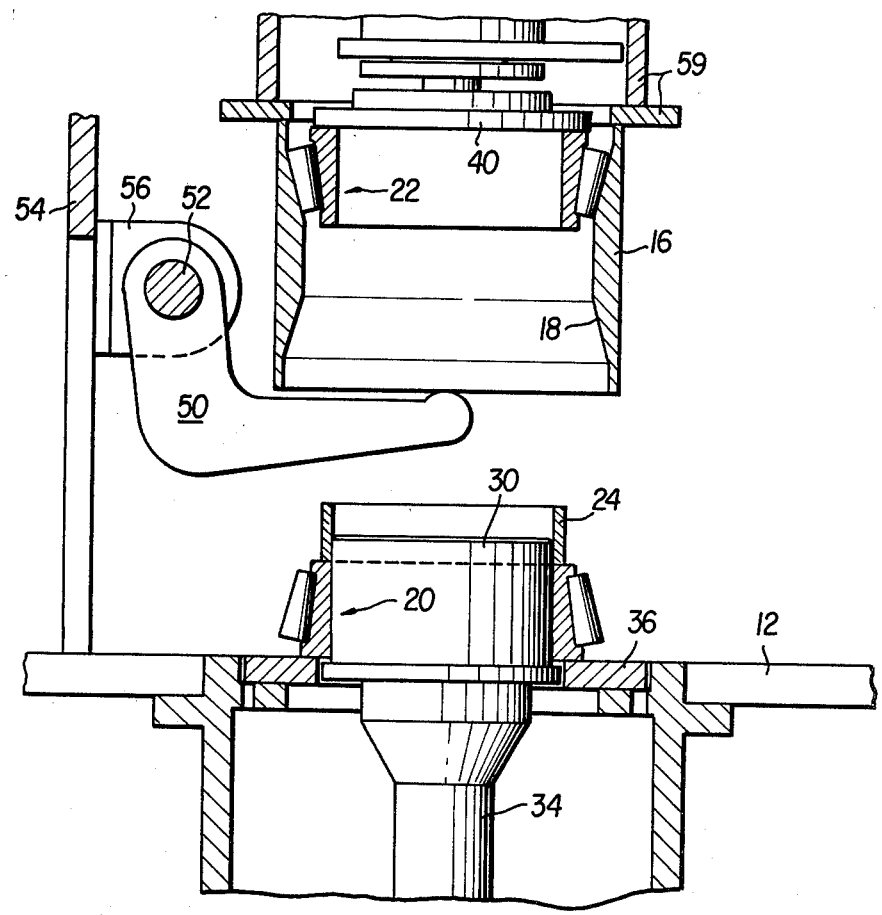
FIG. 4 is a fragmentary vertical elevational view of the apparatus of FIG. 1 showing a position of the apparatus after an out-of-tolerance reading has been obtained.
Figure 5:
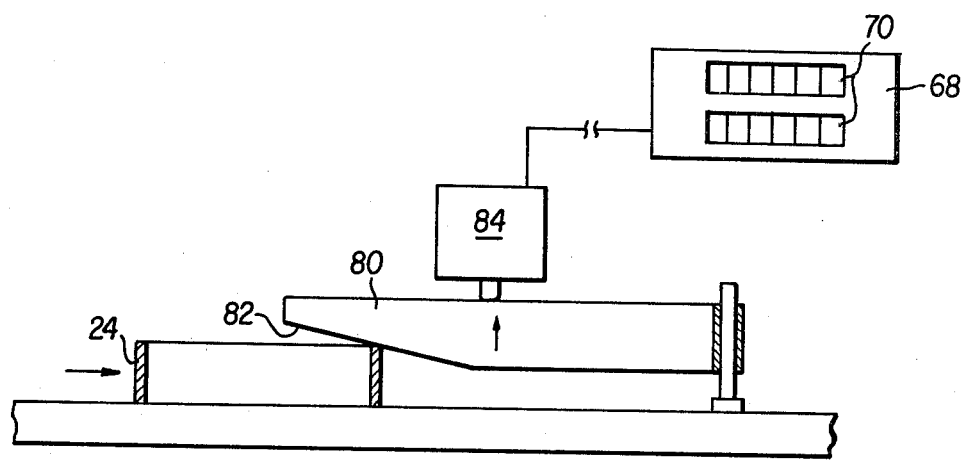
FIG. 5 is a schematic representation of a method for measuring the spacer element itself.

If the reading taken for the axial dimension is out of tolerance, the operator then depresses a button labeled "spacer change". At this time, the cup lock 50 will remain locked and the mandrel 30 will retract lowering only the lower cone assembly 22 and bearing spacer 24 to the position shown in FIG. 4. At this point, the operator removes the spacer and places it on a suitable holder so as to check the depth and parallelism of the spacer in a manner such as is indicated schematically in FIG. 5 to obtain a digital readout thereon. Thus, the spacer 24 is moved against an inclined surface 82 on a guided gauge member 80 and this information is transmitted through a suitable transducer 84 to the digital readout 68. Having determined what the out-of-lateral dimension is and reducing or increasing the spacer thickness, the operator merely changes the spacer and repeats the whole operation.

Safety precautions are taken so that the cycle start is safety interlocked to assure operator safety. The alternate axial positive loading forces of the cone assemblies are identical in both directions to assure a more accurate lateral reading.

While a presently preferred embodiment of the invention has been illustrated and described, it will be recognized that the invention may be otherwise variously embodied practiced within the scope of the claims which follow:

What is claimed is:

1. A method of measuring the axial displacement (lateral) of a tapered roller bearing assembly on a lateral station machine which comprises the steps of
   a. centering a tapered roller bearing assembly on a work surface with respect to a vertical axis of said machine and with said tapered roller bearing assembly including a cylindrical cup having internal raceways which receive a lower cone assembly, an upper cone assembly and a cylindrical spacer between the upper and lower cone assemblies,
   b. inserting a mandrel into the lower cone assembly with said mandrel having flange means engageable with said lower cone assembly in order to lift said lower cone assembly,
   c. lifting said lower cone assembly with said mandrel thereby force loading said lower cone assembly in its raceway within said cup and thereby lifting the entire tapered roller bearing assembly,
   d. supporting said cup in raised position, e. force loading said upper cone assembly while releasing the force loading on said lower cone assembly, and
f. measuring the lateral movement for said roller bearing assembly in moving from one force loading position to the other force loading position.

2. A method of measuring the axial displacement (lateral) as defined in claim 1 including the additional steps of
   a. lowering said mandrel while continuing to support said cup thereby placing said lower cone assembly on said work surface with said spacer stacked thereabove,
   b. replacing said spacer with another spacer,
   c. and raising said mandrel sufficiently far to reinsert said lower cone assembly and the replacement spacer for another measurement.

3. A method of measuring the axial displacement as defined in claim 1 including the additional steps of
   a. discontinuing the support for said cup,
   b. lowering said tapered roller bearing assembly by said mandrel onto said work surface,
   c. and removing said tapered roller bearing assembly from said vertical axis of said machine.

4. A method of measuring the axial displacement as defined in claim 1 including the additional steps of
   a. engaging said upper cone assembly with pressure plate means,
   b. spring loading said pressure plate means,
   c. and effecting force loading of said upper cone assembly and the release of force loading on said lower cone assembly by diminishing the lifting force on said mandrel to an amount less than the force exerted by said spring loading of said pressure plate means.

5. A method of measuring the axial displacement as defined in claim 4 including the additional steps of
   a. rotating said pressure plate means,
   b. and lubricating said upper cone assembly while rotating said pressure plate means.

6. A method of measuring the axial displacement as defined in claim 4 including the additional steps of
   a. using a digital readout means to measure the lateral movement of said roller bearing assembly,
   b. rotating said lower cone assembly to seat the cone rollers of said lower cone assembly and obtain a zero setting for said digital readout means,
   c. rotating said upper cone assembly to seat the cone rollers of said upper cone assembly after effecting force loading of said upper cone assembly by diminishing the lifting force and then obtaining a digital readout indicative of the lateral movement of said roller bearing assembly.

7. A method of measuring the axial displacement as defined in claim 6 including the additional step of obtaining said digital readout from a non-rotating element while said upper cone assembly is being rotated.

8. A method of measuring the axial displacement (lateral) of a tapered roller bearing assembly which includes a cylindrical cup having an internal raceway which receives a lower cone assembly, an upper cone assembly and a cylindrical spacer between the upper and lower cone assemblies which comprises the steps of
   a. inserting a mandrel into the lower cone assembly with said mandrel having flange means engageable with said lower cone assembly in order to lift said lower cone assembly,
   b. lifting said mandrel and thereby force loading said lower cone assembly in its raceway within said cup and thereby lifting the entire tapered roller bearing assembly,
   c. supporting said cup in raised position,
   d. pressing on said upper cone assembly with sufficient force to force load said upper cone assembly thereby releasing the force loading of said lower cone assembly,
   e. and measuring the lateral movement for said roller bearing assembly in moving from one force loading position to the other force loading position.

9. A method of measuring the axial displacement as defined in claim 8 including the additional steps of
   a. engaging said upper cone assembly with pressure plate means,
   b. spring loading said pressure plate means,
   c. and effecting force loading of said upper cone assembly and the release of force loading on said lower cone assembly by diminishing the lifting force on said mandrel to an amount less than the force exerted by said spring loading of said pressure plate means.

10. A method of measuring the axial displacement as defined in claim 9 including the additional steps of
    a. rotating said pressure plate means,
    b. and lubricating said upper cone assembly while rotating said pressure plate means.

11. An apparatus for measuring the axial displacement (lateral) of a tapered roller bearing assembly with said bearing assembly including a cylindrical cup having an internal raceway which receives a lower cone assembly, an upper cone assembly and a cylindrical spacer between the upper and lower cone assemblies, said apparatus comprising:
    a. a work surface on said apparatus for receiving tapered roller bearing assemblies to be measured,
    b. means for centering one of said roller bearing assemblies on a vertical center line of said apparatus,
    c. mandrel means movable vertically from a position below said work surface to a position thereabove,
       (1) said mandrel means having flange means for supporting the bottom of said lower cone assembly in order to lift the entire roller bearing assembly off said work surface and to force load said lower cone assembly,
    d. means for locking said cup of said tapered roller bearing assembly in non-rotating position above said work surface,
    e. pressure plate means secured to one end of a rotatable shaft and engageable with said upper cone assembly,
    f. spring means for spring loading said pressure plate means and for force loading of said upper cone assembly,
    g. means to rotate said pressure plate means,
    h. and means to measure the lateral movement of said roller bearing assembly when it moves from one force loading position to the other force loading position.

12. An apparatus for measuring the axial displacement as defined in claim 11 wherein said means for locking said cup of said tapered roller bearing assembly is a bifurcated member which engages said cup and which permits said mandrel to be withdrawn to a position beneath said work surface so as to deposit said lower cone assembly on said work surface with said spacer stacked thereabove.

13. An apparatus for measuring the axial displacement as defined in claim 11 wherein said means for centering one of said roller bearing assemblies is a power driven V-shaped plate member which also functions to eject a roller bearing assembly after its lateral dimension has been measured to be within acceptable tolerances and after said roller bearing assembly has been re-deposited on said work surface by withdrawal of said mandrel means beneath said work surface.

14. An apparatus for measuring the axial displacement as defined in claim 11 wherein said means to measure the lateral movement of said roller bearing assembly consists of a digital readout device having an indicator position fixed for all bearing sizes.

15. An apparatus for measuring the axial displacement as defined in claim 14 wherein the axial displacement of the cone assemblies used to measure the lateral movement of said roller bearing assembly is taken from a non-rotating member axially movable with said pressure plate means.

16. An apparatus for measuring the axial displacement as defined in claim 11 including means to lubricate the cone rollers and cup raceway of said roller bearing assembly while said pressure plate means is being rotated.

17. An apparatus for measuring the axial displacement as defined in claim 12 wherein said means to measure the lateral movement of said roller bearing assembly consists of a digital readout device having an indicator position fixed for all bearing sizes.

18. An apparatus for measuring the axial displacement as defined in claim 17 wherein the axial displacement of the cone assemblies used to measure the lateral movement of said roller bearing assembly is taken from a non-rotating member axially movable with said pressure plate means.

19. An apparatus for measuring the axial displacement as defined in claim 12 including means to lubricate the cone rollers and cup raceway of said roller bearing assembly while said pressure plate means is being rotated.

* * * * *